United States Patent [19]

Johnson, Jr. et al.

[11] 4,313,500
[45] Feb. 2, 1982

[54] SACRIFICIAL ADSORBATE FOR SURFACTANTS UTILIZED IN CHEMICAL FLOODS OF ENHANCED OIL RECOVERY OPERATIONS

[75] Inventors: James S. Johnson, Jr., Oak Ridge; Clyde G. Westmoreland, Rockwood, both of Tenn.

[73] Assignee: The United States of America as represented by the United States Department of Energy, Washington, D.C.

[21] Appl. No.: 179,909

[22] Filed: Aug. 20, 1980

[51] Int. Cl.³ .............................................. E21B 43/22
[52] U.S. Cl. ................... 166/273; 166/274; 166/175; 166/305 R; 252/8.55 D
[58] Field of Search ........... 166/273, 274, 275, 305 R; 252/8.55 D

[56] References Cited

U.S. PATENT DOCUMENTS

| | | | |
|---|---|---|---|
| 1,823,440 | 9/1931 | DeGroote et al. | 252/8.55 D |
| 4,006,779 | 2/1977 | Kalfoglou | 166/273 X |
| 4,157,115 | 1/1979 | Kalfoglou | 166/275 X |
| 4,235,290 | 11/1980 | Kalfoglou | 166/274 X |

Primary Examiner—Stephen J. Novosad
Assistant Examiner—George A. Suchfield
Attorney, Agent, or Firm—Earl L. Larcher; Stephen D. Hamel; Richard G. Besha

[57] ABSTRACT

The present invention is directed to a sacrificial or competitive adsorbate for surfactants contained in chemical flooding emulsions for enhanced oil recovery operations. The adsorbate to be utilized in the method of the present invention is a caustic effluent from the bleach stage or the weak black liquor from the digesters and pulp washers of the kraft pulping process. This effluent or weak black liquor is injected into an oil-bearing subterranean earth formation prior to or concurrent with the chemical flood emulsion and is adsorbed on the active mineral surfaces of the formation matrix so as to effectively reduce adsorption of surfactant in the chemical flood. Alternatively, the effluent or liquor can be injected into the subterranean earth formation subsequent to a chemical flood to displace the surfactant from the mineral surfaces for the recovery thereof.

7 Claims, 2 Drawing Figures

SACRIFICIAL ADSORBATE FOR SURFACTANTS UTILIZED IN CHEMICAL FLOODS OF ENHANCED OIL RECOVERY OPERATIONS

This invention was made as the result of a contract with the U.S. Department of Energy.

BACKGROUND OF THE INVENTION

Generally, the present invention relates to enhanced oil recovery by employing chemical floods containing a surfactant, and more particularly to an improvement in the method of chemical flooding wherein a sacrificial adsorbate is utilized to reduce the adsorption of the surfactant in the matrix of the oil-containing subterranean earth formation.

The recovery of oil from oil-bearing subterranean earth formations, or reservoirs, is usually initially achieved by employing primary recovery procedures which entail the use of pumping mechanisms together with natural reservoir pressures. Often the reservoir pressure is sufficient to recover a considerable quantity of oil prior to the initiation of pumping.

Enhanced oil recovery procedures are used for extracting additional oil from the reservoir subsequent to the primary recovery operations. One of the most common enhanced oil recovery procedures is the use of a water flood where water is injected under pressure into the subterranean earth formation to displace the oil in the formation towards a suitable production well for the recovery thereof. Inasmuch as water is immiscible with oil and results in high interfacial tension therebetween, a significant amount of the "recoverable" oil remains in the reservoir. Chemical flooding procedures are then utilized to displace additional oil from the reservoir. In chemical flooding a slug of water-based emulsion containing an organic sulfonate surfactant and alcohol co-surfactants is injected into the well for lowering the interfacial tension between the oil and water and thereby providing a more efficient oil recovery mechanism. Often the surfactant emulsion is driven through the oil reservoir by a pusher formed of a "thick" water which is thickened by a polyacrylamide or by a polymer. The combined sulfonate emulsion and pusher is commonly referred to as micellar flooding. The reduced surface tension caused by the emulsion permits oil in the pores of the rock to mix more readily with the surfactant emulsion so that oil is forced out of the reservoir and coalesces as the slug is pushed along. In the use of such chemical floods, a significant percentage of the surfactant is adsorbed in the formation matrix so as to significantly alter the composition of the flood as well as to significantly reduce the amount of surfactant as it progresses through the formation.

The adsorption of the surfactant component in the formation matrix reduces the effectiveness of the chemical flood as it progresses through the earth formation. To over-come this adsorption problem, additional surfactants must be included in the flood to minimize the deleterious effects of the surfactant adsorption. Other efforts to minimize the effects of adsorption of the surfactant include the use of competitive or sacrificial adsorbates which are injected into the earth formation prior to or concurrent with the surfactant dispersion. These sacrifical adsorbates compete with the surfactant and adsorb on potential adsorption sites in the formation matrix to thereby significantly diminish the overall surfactant adsorption as the emulsion progresses through the earth formation. A group of chemical compounds found to possess sacrificial adsorbate properties is lignosulfonates, such as described in U.S. Pat. No. 4,006,779 which issued Feb. 8, 1977 and entitled "Lignosulfonates As Sacrificial Agents in Oil Recovery Processes". A further discussion of lignosulfonate is in the research publication article entitled "Wood Chemicals Inject New Life into Tired Oil Wells," June 20, 1979, of *The Chemical Week*, p. 65.

A suitable sacrificial adsorbate should be cost-effective in chemical floods since it is to be sacrificed or adsorbed by the formation and cannot be readily recovered. The lignosulfonates are relatively inexpensive as compared to sulfonates used in chemical floods. Lignosulfonates are by-products of a wood pulping process utilizing sulfites or as a product of the sulfonation of lignin fraction recovered from the waste streams of wood pulping processes including the common kraft process. This provides a relatively abundant source of lignin which is the basic constituent utilized in manufacturing lignosulfonates. There are, however, several different uses of lignosulfonates, such as in the manufacture of drilling mud and glues suitable for laminated woods which increase the cost of lignosulfonates. Further, the refinement of lignin and preparation of the lignosulfonates therefrom are expenses which cause the lignosulfonates to lose some of the cost advantage over that of the sulfonates commonly used in chemical floods.

SUMMARY OF THE INVENTION

The primary aim or objective of the primary invention is to provide an improved competitive or sacrificial adsorbate for use in enhanced oil recovery processes for effectively reducing the adsorption of chemical flood sulfonates in subterranean earth formation matrices. The present invention is used in an enhanced oil recovery operation in which a water-based emulsion containing a water-based surfactant dispersion is injected into an oil containing subterranean earth formation for displacing oil therefrom for recovery. The improvement in this recovery operation provided by the present invention comprises the injection of a sufficient quantity of a sacrificial adsorbate consisting of the effluent from the caustic extraction stage or the weak black liquor from the pulp digester blowdown and pulp washer of a draft wood-bleaching process into the earth formation for adsorption thereby to effectively inhibit adsorption of the surfactant constituents from the water-based dispersion. The weak black liquor and the caustic extract from the bleach plant are competitive with lignosulfonate as a sacrificial adsorbate and are available in significant quantities so as to render them highly advantageous for use in chemical floods since they are available at a cost considerably less than that of the sulfonates used in the chemical flood.

Other and further objects of the invention will be obvious upon an understanding of the illustrative method about to be described or will be indicated in the appended claims, and various advantages not referred to herein will occur to one skilled in the art upon employment of the invention in practice. The phrase "chemical floods" as used herein is directed to the use of a water-based emulsion containing an organic sulfonate surfactant and alcohol co-surfactants or the use of these surfactants together with a polyacrylamide or a biopolymer as in a micellar flood.

Figure 1:
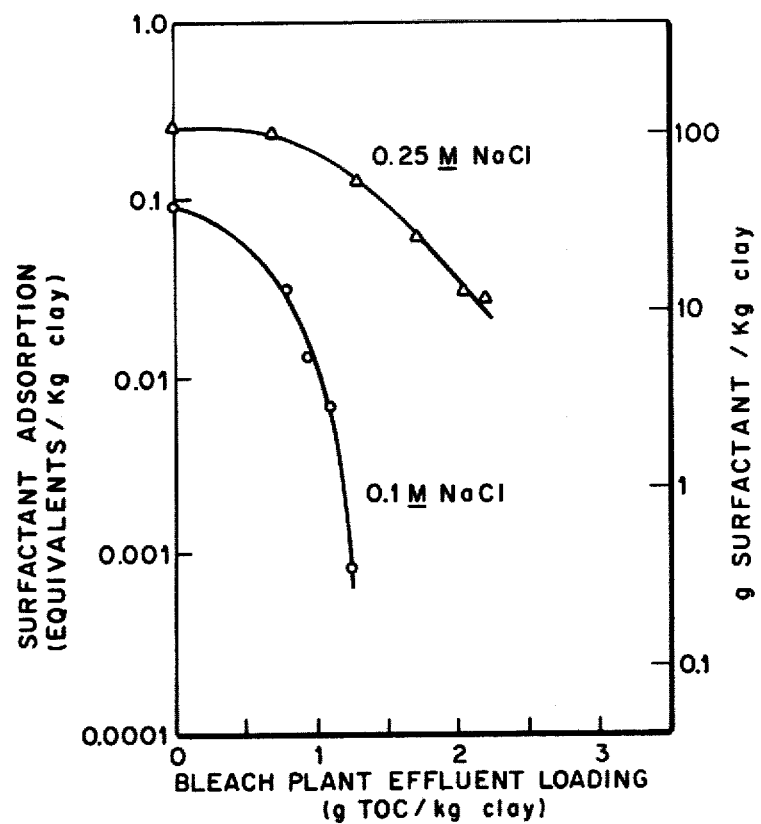
FIGS. 1 and 2 are graphical plots showing the adsorption of surfactant on a sodium form of montmorillonite with 0.1 M and 0.25 M NaCl solutions contacted with caustic bleach plant effluent of the same molarity.
Figure 2:
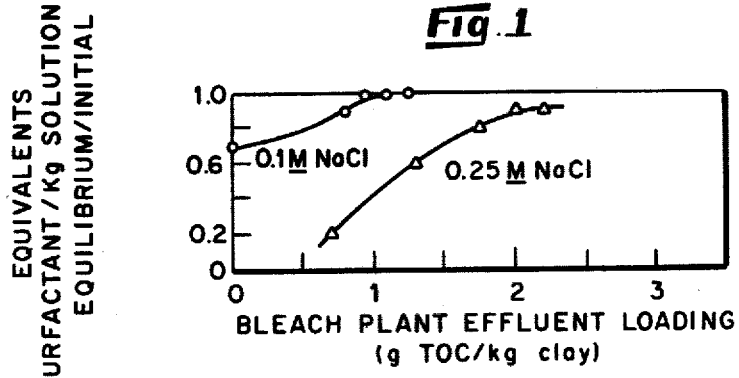

The plots of FIGS. 1 and 2 have been chosen for the purpose of illustration and description of the invention. These plots are not intended to be exhaustive or to limit the invention to the precise form illustrated. The plots are chosen and described in order to best explain the principles of the invention and their application in practical use to thereby enable others skilled in the art to best utilize the invention in various embodiments and modifications as are best adapted to the particular use contemplated.

DESCRIPTION OF THE INVENTION

The present invention is directed to an improved method for enhanced oil recovery wherein a sacrificial adsorbate is utilized with chemical flooding procedures employing surfactants. In accordance with the present invention it has been found that the effluent from the caustic extraction stage of the kraft wood pulp bleaching process or weak black liquor which is the blowdown from the kraft pulp digester and the pulp washer is highly effective for reducing the adsorption of surfactant of the chemical flood on minerals in the subterranean earth formation matrix for significantly enhancing the chemical flood efficiency.

The caustic extract is an effluent from the washing of pulp in the kraft bleach plant with a sodium hydroxide solution after the pulp has been bleached by exposure to oxidizing agents, such as $Cl_2$ or $ClO_2$. The extract contains a large fraction of colored material remaining in the pulp before bleaching as oxidized and chlorinated lignin somewhat degraded in molecular size plus some wood sugars and related carbohydrates. The composition of the extract varies from wood to wood but a typical composition of the caustic extract is aobut 1 gram of total organic carbon (TOC) per liter of extract, about 0.01 M chloride, and a pH of about 9. Caustic bleach plant effluent diluted or concentrated to have a total organic carbon concentration in the range of about 0.1 to 10 grams per liter of extract, and a pH in the range of about 5 to 11 is believed to function satisfactorily as a sacrificial agent for surfactants in accordance with the present invention. The chloride concentrate is not critical and can be readily adjusted by a NaCl addition to appropriate values.

The total organic carbon of the extract was determined by employing a Beckman 915 TOC analyzer. In using the Beckman analyzer two samples of the extract are analyzed, one by catalytic combustion for total carbon and the other by acid displacement of $CO_2$ for determining inorganic carbon. In both samples $CO_2$ is swept through an infrared analyzer by a gas stream. The difference in carbon in the streams is total organic carbon. Ratios of total organic carbon to organic matter vary with the compounds present in the bleach plant effluent. Normally, total solids, which are not all organic, are in a ratio to total organic carbon in a neighborhood of about 5–6 to 1. A detailed description of the kraft pulping and bleaching process, particularly the bleach plant and the pulp digester blowdown and pulp washing operations, is set forth in an article entitled "The Pulping of Wood", *Pulp and Paper Manufacturer*, Vol. I, Second Edition, 1969. This article is incorporated herein by reference.

In the kraft process the wood chips are broken down to fibers by cooking under pressure with "white liquor". At the end of the washing period the pressure is released and the mixture of fibers and liquor is expelled to a blowdown tank. This expelled liquor, referred to as black liquor, which contains about 15% solids and most of the lignin removed from the wood, is separated from the fibers. Additional black liquor is recovered from pulp-washing downstream from the blowdown tank.

Like the caustic extract the composition of the weak black liquor varies from wood to wood. Black liquor having a TOC concentration in the range of about 45 to 60 grams per liter of liquor and a pH in the range of about 11 to 14 provides a satisfactory sacrificial adsorbate in accordance with the present invention.

In the method of the present invention the caustic bleach plant effluent or the weak black liquor is preferably injected into the subterranean earth formation containing the oil through a suitable injection well as a preflush in advance of the chemical flood which in turn is utilized to displace the oil from mineral sites in the formation and convey it to a suitable production well for the recovery thereof. In the subject method, the bleach plant effluent or weak black liquor is adsorbed on the active mineral surfaces of the formation matrix as a precoat so as to allow the surfactant in the chemical flood to flow through the formation without being extensively altered in composition or concentration due to surfactant adsorption. In the event it is desired to mix the bleach plant effluent or the weak black liquor with the chemical flood, it has been found that it is a highly competitive adsorbate. Also, the caustic bleach plant effluent or the weak black liquor can be included or utilized as a post-treatment flush to displace previously adsorbed surfactant from the mineral sites in the subterranean earth formation for the recovery thereof.

While it is not clearly understood what precise physical and/or chemical mechanisms are responsible for the effectiveness of the caustic bleach plant effluent or the weak black liquor utilized in the method of the present invention, it is theorized that reactions involving lignin compounds contained in the bleach plant effluent and the black liquor contribute significantly to the effectiveness of the adsorbate.

In order to provide a more facile understanding of the present invention, examples utilized to simulate conditions under which the caustic bleach plant effluent is used as a preflush to reduce surfactant adsorption are set forth below in Examples I, II, and III. In these examples the materials used to simulate oil-bearing earth formations include sea sand which represents silica, a major component of sandstone, ground Berea sandstone, as a representative of natural formations, and Wyoming montmorillonite, as a representative of clays. In the examples competitive adsorption is illustrated with a typical petroleum sulfonate surfactant commercially available as Witco TRS 10-80. This surfactant is available from the Witco Chemical Company. The bleach plant effluent was obtained from the kraft pulp bleaching process of the International Paper Company at Mobile, Alabama.

EXAMPLE I

Adsorption of the Witco 10-80 surfactant on solids not pretreated by the bleach plant effluent was determined by contacting the sea sand, Berea sandstone and the montmorillonite with solutions of the surfactant adjusted to a 0.1 M NaCl solution. Measurements were taken at batch equilibrium with a contact time of 18 hours with shaking at ambient temperature. The solids were separated from the surfactant solution by centrifugation and the amount adsorbed determined by the difference in surfactant concentration between the initial and the undiluted solution. The surfactant was assayed by a two-phase titration process. (V. W. Reid, G. F. Longman, and E. Heinerth, *Tenside*, Vol. 4, pp. 292–304 (1967), "Determination of Anion Active Detergents by Phase Titration") The adsorption on sea sand was sufficiently low as to be insignificant but for the other materials the distribution coefficients, that is the ratio of equivalents of surfactant per liter of solution to equivalents per kg of solid, were appreciable being about 5 l/kg for sandstone and several hundred liters per kilogram for montmorillonite. The results of these tests are set forth in Table I below.

EXAMPLE II

Tests of the adsorption of the sulfonate with the caustic bleach plant effluent combined therewith as a competitive adsorbate were performed on samples of Berea sandstone and montmorillonite by contacting the samples with bleach plant effluent adjusted to 0.1 M Nacl. The contact was effected by shaking the effluent and samples for 18 hours at ambient temperature. The solids were then centrifuged and as much liquid as possible decanted. The amount of bleach plant effluent adsorbed by the solids was determined by measuring the total organic carbon before and after the contacting of the solids. The solid samples with the adsorbed bleach plant effluent where then contacted with the solution of surfactant adjusted to a 0.1 M NaCL solution. The solution containing unadsorbed surfactant was then separated from solids by centrifugation and measured by titration. The results from these tests are tabulated in Table I indicating that the adsorption of the surfactant was much less on the minerals previously exposed to the caustic bleach plant effluent.

EXAMPLE III

Samples of montmorillonite converted to sodium form and shaken in centrifuge tubes with 0.1 M and 0.25 NaCl solutions were respectively contacted with solutions of 0.25 and 0.1 M NaCl containing different concentrations of caustic bleach plant effluent for a period of 16 hours. These solutions were then equilibrated with solutions of the same concentrations of NaCl containing 0.009 equivalents per liter of the surfactant with the amount of surfactant being determined by the above-described two-phase titration process. The adsorption of the surfactant as a function of the caustic bleach plant effluent is shown in FIGS. 1 and 2. As will be apparent from these figures, it will be seen that 1 gram of caustic bleach plant effluent total organic carbon per kilogram of clay reduces the loss of surfactant by approximately a factor of 10 from the 0.1 M NaCl solution and that 2 grams of the bleach plant effluent total organic carbon per kilogram of clay reduces the adsorption of surfactant from a 0.25 NaCl solution by the same factor. With higher salt concentrations, more surfactant is adsorbed from the solution. Thus the amounts of surfactant saved per gram bleach plant effluent total organic carbon are similar for the two salt concentrations.

As a further demonstration of the present invention a comparison was made between the caustic bleach plant effluent and the weak black liquor with competitive adsorbates including lignosulfonates and other portions of the effluent from the wood pulping process. As set forth in Table II below, the adsorbates for petroleum sulfonates include tests utilizing no sacrificial agent, kraft bleach plant effluents, including acid bleach, caustic extract I, caustic extract II, sodium saccharinate, weak black liquor, kraft lignin, and lignosulfonate. The acid bleach effluent is from the oxidizing step of the bleach process in the kraft pulping process and is typically of considerable lower solute content than the caustic extract. The acid bleach effluent emerges from the process moderately acidic with a pH about 2.5 and in common with the other materials tested was adjusted to neutrality by NaOH or HCl before equilibration. The caustic extracts I and II were from two different lots believed to have come from soft wood. The weak black liquor is the blowdown from the kraft digestion of wood and is diluted from its original concentration of about 15% solids to the concentration used. Sodium saccharinate is a mixture of carbohydrates oxidized to compounds containing a carboxylic group, contaminated liberally with lignin species. It can be isolated from weak black liquor. The kraft lignin (Indulin AT) is a commercially avaiable purified form of black liquor and the lignosulfonate is a commercially available product (Polyfon F), both obtained from the Westvaco Corporation, located at Charleston Heights, South Carolina. As it will appear clear from Table II, the lignin substances adsorbed by the Berea sandstone and the montmorillonite vary over a wide range but there is little correlation between the amount adsorbed and the loss of surfactant. All of the lignin substances decrease surfactant adsorption to some degree with the acid bleach being the least effective. The caustic extracts I and II and the weak black liquor were the most effective of the group in competitive adsorption based on distribution coefficients of surfactant. Sodium saccharinate and lignosulfonate appear to have an effectiveness insignificantly less than the caustic extracts.

It will appear clear that the improvement in the enhanced oil recovery process as provided by the present invention is in the utilization of the caustic bleach plant effluent and the weak black liquor which are highly cost-effective due to their abundant supply and relative low cost compared to that of the surfactant. The use of caustic bleach plant effluent overcomes the problems heretofore encountered in the disposal of the effluent as waste from the kraft pulping process. The effluent or the weak black liquor can be used effectively at the concentration received from the kraft process but can be readily concentrated if a higher concentration is desired for use or for transportation to the injection site.

TABLE 1

Effect of Kraft Pulping Effluents on Adsorption of Petroleum Sulfonate on Minerals
(All solutions 0.1 M NaCl; surfactant, Witco TRS 10-80)

| | | Adsorption of Pulping Effluent | | | | Adsorption of Surfactant | | | |
| | | Effluent* | | | | Initial | | Adsorbed | |
| Mineral | Solid g | Type | Initial Conc., gTOC/l | Equil. Conc. gTOC/l | Adsorbed, gTOC/kg Solid | Dist. Coef., l/kg | Surfactant Conc., Equiv/l × 10³ | Equilibrium Surf. Conc., Equiv/l × 10³ | Surfactant Equiv/kg Solid · KO³ | Dist. Coef. l/kg |
|---|---|---|---|---|---|---|---|---|---|---|
| Sea Sand | 10 | | | | | | 1.85 | 1.78 | .50 | 0.28 |
| Berea Sandstone | 10 | | (Preliminary) | | | | 1.85 | 0.72 | 3.4 | 4.7 |
| | 8 | | (Repeat) | | | | 1.88 | 0.63 | 3.9 | 6.2 |
| | 8 | WBL | 0.54 | 0.44 | 0.29 | 0.65 | 1.63 | 1.52 | 0.4 | 1.2 |
| | 8 | BPE | 0.48 | 0.41 | 0.21 | 0.52 | 1.60 | 1.58 | Not significant | |
| Montmorillonite | 0.5 | | (Preliminary) | | | | 1.85 | 0.28 | 94 | 340 |
| | 0.3 | | (Repeat) | | | | 1.88 | 0.166 | 140 | 825 |
| | 0.3 | WBL | 0.54 | 0.45 | 7.4 | 16 | 1.62 | 1.31 | 30 | 23 |
| | 0.3 | BPE | 0.26 | 0.18 | 6.1 | 33 | 1.68 | 1.64 | (4) | (2) |
| | 0.3 | BPE | 0.48 | 0.39 | 7.3 | 19 | 1.74 | 1.72 | Not significant | |
| | 0.3 | BPE | 0.48 | 0.38 | 8.6 | 23 | 1.70 | 1.76 | Not significant | |
| | 0.3 | BPE | 0.99 | 0.87 | 10 | 12 | 1.68 | 1.77 | Not significant | |

*WBL: Weak black liquor; TOC of undiluted feed, 43.5 g/l.
BPE: Bleach plant effluent; TOC of undiluted feed, 1.25 g/l.

TABLE II

Competitive Adsorbates for Petroleum Sulfonates: Comparison
of Wood-Pulping Byproducts and Wastes
Adsorbent: Montmorillonite, sodium form
Medium: 0.25 M NaCl
Surfactant: Witco TRS 10-80, deoiled; initial concentration
approx. 0.007 equiv/kg soln; 40 g soln/g clay
Competitive Adsorbate: Wood product solution, adjusted to pH 7;
25 g soln/g clay (preequilibrated)

| | Sacrificial Agent | | | Surfactant (at equilibrium) | | |
| | Concentration, g TOC/kg soln | | Adsorbed, g TOC/ | Conc., Equiv/ | Adsorbed, Equiv/ | Distribution |
| Material Tested | Initial | Equil. | kg clay | kg soln | kg clay | Coefficient |
|---|---|---|---|---|---|---|
| No sacrificial agent | | | | 0.0010 | 0.24 | 239 |
| Kraft Bleach Plant Effluents | | | | | | |
| Bleach Effluent | 0.15 | 0.14 | 0.12 | 0.0019 | 0.20 | 105 |
| Caustic Extract I | 0.24 | 0.19 | 1.38 | 0.0051 | 0.076 | 15 |
| Caustic Extract II | 0.36 | 0.33 | 0.90 | 0.0052 | 0.067 | 13 |
| Sodium Saccharinate | 0.37 | 0.19 | 4.7 | 0.0033 | 0.13 | 39 |
| Weak Black Liquor | 0.31 | 0.19 | 2.8 | 0.0046 | 0.077 | 17 |
| Kraft Lignin | 0.15 | 0.02 | 3.3 | 0.0025 | 0.16 | 63 |
| Lignosulfonate | 0.23 | 0.11 | 3.1 | 0.0039 | 0.11 | 28 |

What is claimed is:

1. An improvement in the method of enhanced oil recovery wherein a water-based emulsion containing a surfactant is injected into an oil-containing subterranean earth formation for displacing oil therefrom for recovery purposes, said improvement comprising the injection of a sufficient quantity of a solution selected from the group consisting of the effluent from the caustic extraction stage of the kraft wood pulp bleaching process and the weak black liquor from the pulp digester and pulp washer of the kraft process into the earth formation for adsorption thereby to effectively inhibit adsorption of surfactant constituents of the water-based surfactant emulsion.

2. The improvement in the method of enhanced oil recovery as claimed in claim 1, wherein the effluent is characterized by a total organic carbon concentration in the range of about 0.1 to 10 grams per liter of extract and a pH in the range of about 5 to 11.

3. The improvement in the method of enhanced oil recovery as claimed in claim 1, wherein the weak black liquor is characterized by a total organic carbon concentration in the range of about 45 to 60 grams per liter of liquor and a pH in the range of about 11 to 14.

4. The improvement in the method of enhanced oil recovery as claimed in claim 1, wherein the water-based emulsion comprises organic sulfonate surfactants, and alcohol co-surfactants.

5. The improvement in the method of enhanced oil recovery as claimed in claim 1, wherein the water-based emulsion comprises organic sulfonate surfactants and alcohol cosurfactants, and wherein the water-based emulsion is pushed through the earth formation by water thickened with one of polyacrylamide and biopolymer.

6. The improvement in the method of enhanced oil recovery as claimed in claim 1, wherein the effluent or weak black liquor is injected into the earth formation prior to the injection of the water-based emulsion.

7. The improvement in the method of enhanced oil recovery as claimed in claim 1, wherein the effluent or weak black liquor is injected into the earth formation concurrent with the injection of water-based emulsion.

* * * * *